Figure 1:
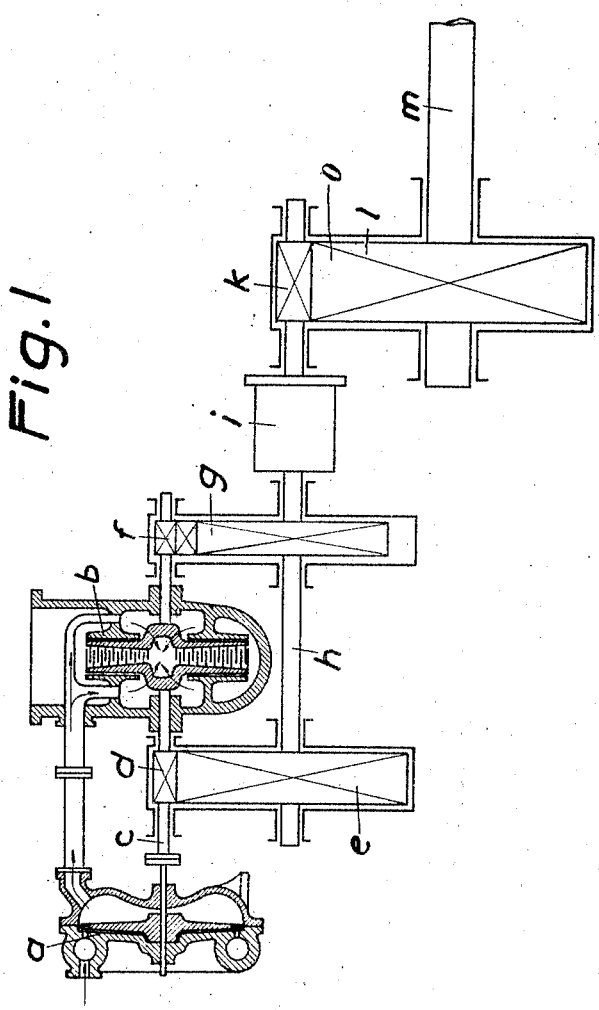

O. A. WIBERG.
STEAM OR GAS TURBINE PLANT.
APPLICATION FILED JAN. 10, 1919.

1,334,576.

Patented Mar. 23, 1920.
2 SHEETS—SHEET 1.

Inventor.
Oscar Anton Wiberg,
By Henry M ——
Atty.

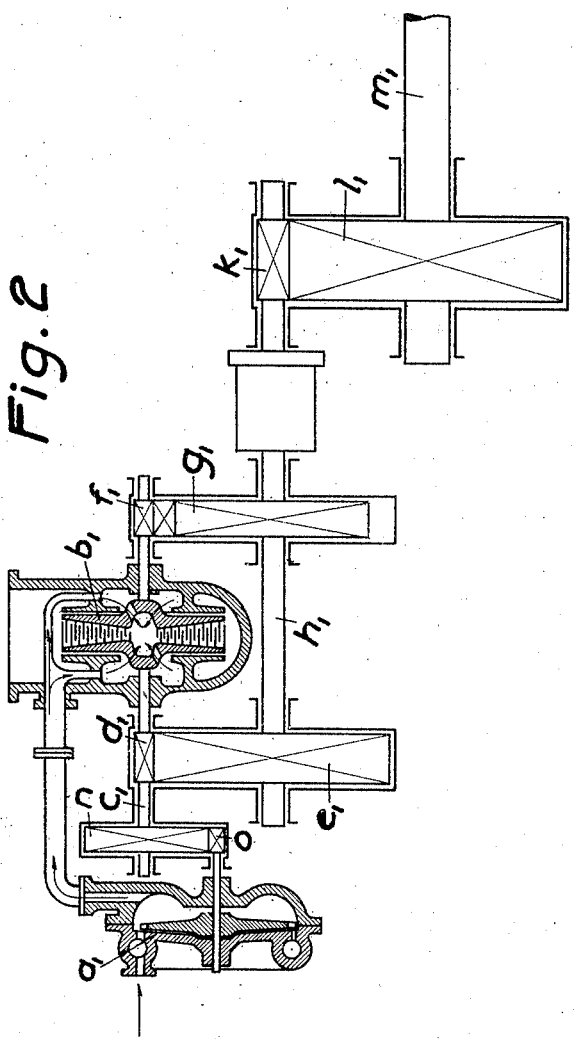

UNITED STATES PATENT OFFICE.

OSCAR ANTON WIBERG, OF FINSPONG, SWEDEN.

STEAM OR GAS TURBINE PLANT.

1,334,576.  Specification of Letters Patent.  Patented Mar. 23, 1920.

Application filed June 10, 1919. Serial No. 303,219.

*To all whom it may concern:*

Be it known that I, OSCAR ANTON WIBERG, a citizen of the Kingdom of Sweden, residing at Finspong, Sweden, have invented new and useful Improvements in Steam or Gas Turbine Plants, of which the following is a specification.

This invention relates to a steam or gas turbine plant having a high pressure member and a low pressure member the object of the invention being to enable an efficient utilization of the energy of the driving fluid.

The invention consists, chiefly, in this that the high pressure member consists of an impulse turbine of the axial type while the low pressure member consists of a radial turbine of the double rotation type with or without radially extending blades. By a suitable combination of the said two turbine types a very good efficiency of the whole plant may be obtained owing to the fact that the single-disk impulse turbine when operating as a high pressure turbine secures a very good steam economy when the number of revolutions is great and the diameter of the wheel is small, the radial turbine of the double rotation type having a very good efficiency when used as a low pressure turbine due to the great outlet areas which may be obtained in such case. In order to facilitate the use of the great number of revolutions at which such a plant must operate it is desirable, for instance when using the plant for driving propeller shafts, for which purpose the invention is specially adapted, to effect the absorption of power from a shaft driven by means of toothed gears or the like at a reduced speed.

In the accompanying drawing, forming part of this specification, Figures 1 and 2 show two embodiments of the invention, respectively.

With reference to Fig. 1, the character $a$ indicates a high pressure turbine constructed as an axial impulse turbine while $b$ indicates a low pressure turbine, consisting of a double rotation radial turbine. The shaft of the high pressure tubine $a$ and one of the shafts $c$ of the low pressure turbine are directly connected together. The shaft $c$ carries a pinion $d$ meshing with a toothed wheel $e$. The other shaft of the double rotation turbine carries a pinion $f$ connected through an intermediate wheel to a toothed wheel $g$. By means of the said intermediate wheel the toothed wheels $e$ and $g$ obtain the same direction of rotation. The said two last-mentioned toothed wheels are attached to the shaft $h$. It is desirable to form the toothed wheel $e$ with a considerably great width as compared with the toothed wheel $g$ as the former will transmit both the power of the high pressure turbine and half the power of the low pressure turbine to the common shaft $h$. The shaft $h$ carries a reversing gear $i$ as well as a pinion $k$ meshing with the toothed wheel $l$ on the driven shaft $m$, which may be for instance a propeller shaft.

In order that the high pressure turbine may be given the number of revolutions securing the most efficient output, which of course does not coincide in all cases with the number of revolutions of the low pressure turbine the construction may be modified as set forth in Fig. 2.

In this figure, the character $a_1$ indicates a high pressure turbine constructed in the same way as set forth in connection with Fig. 1. The character $b_1$ indicates the low pressure turbine likewise constructed in the same way as set forth in connection with Fig. 1. One of the shafts of the low pressure turbine carries besides the pinion $d_1$ also a toothed wheel $n$. The shaft of the high pressure turbine is provided with a pinion $o$, meshing with the toothed wheel $n$. Thus, both the power of the high pressure turbine and half the power of the low pressure turbine will be transmitted to the toothed wheel $g_1$ through the pinion $d_1$. The other shaft of the low pressure turbine is connected through the pinion $f_1$, the toothed wheel $g_1$ and suitable intermediate wheels to the common shaft $h_1$ of the two toothed wheels $e_1$ and $g_1$. The power is further transmitted to the driven shaft $m$ by means of the pinion $k_1$ and the toothed wheel $l_1$.

From the above description it is seen that in the arrangement shown in Fig. 2, the high pressure turbine may be given any suitable number of revolutions by choosing a suitable ratio of gearing of the toothed gear $(n, o)$.

I claim—

1. A turbine plant for steam or gas, comprising in combination a high pressure member, consisting of an impulse turbine of the axial type, and a low pressure member consisting of a radial turbine of the double rotation type, one of the shafts of the said double rotation turbine being connected to the shaft of the high pressure turbine by means of a toothed gear.

2. A turbine plant for steam or gas comprising in combination a high pressure member consisting of an impulse turbine of the axial type, a low pressure member, consisting of a radial turbine of the double rotation type, the high pressure turbine being constructed for a great number of revolutions as compared with the low pressure turbine, and a speed reducing toothed gear connecting the shaft of the high pressure turbine to one of the shafts of the low pressure turbine.

In testimony whereof I have signed my name.

OSCAR ANTON WIBERG.